Figure 1:
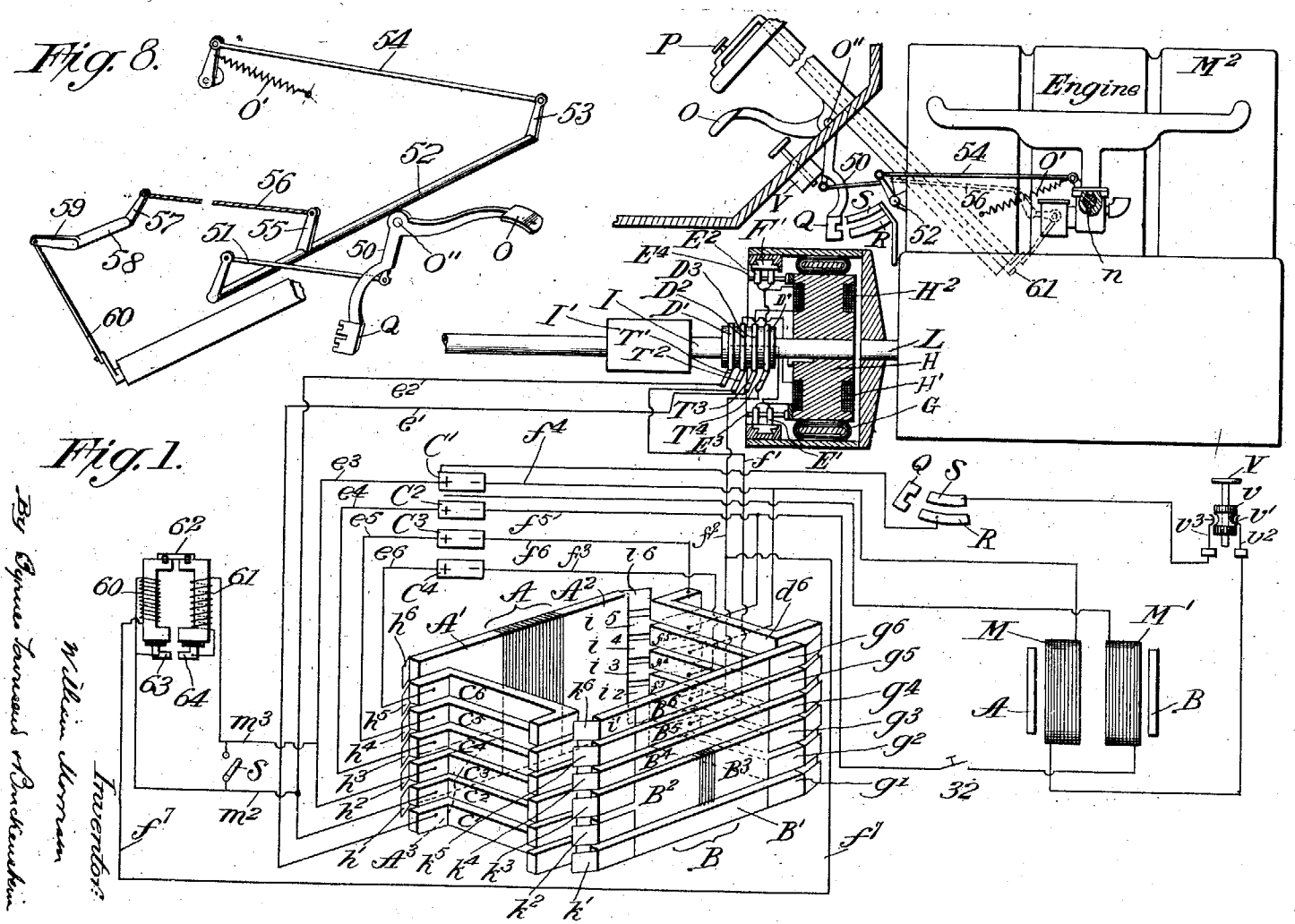

W. MORRISON.

CENTRIFUGALLY REGULATED POWER TRANSMISSION SYSTEM.

APPLICATION FILED SEPT. 9, 1916.

Reissued Nov. 28, 1916.

14,219.

4 SHEETS—SHEET 1.

Inventor:
William Morrison
By Byrnes Townsend & Brickenstein
Attorneys:

W. MORRISON.

CENTRIFUGALLY REGULATED POWER TRANSMISSION SYSTEM.

APPLICATION FILED SEPT. 9, 1916.

Reissued Nov. 28, 1916.

14,219.

4 SHEETS—SHEET 2.

Inventor

William Morrison

By Byrnes Townsend & Brickenstein

Attorneys

W. MORRISON.

CENTRIFUGALLY REGULATED POWER TRANSMISSION SYSTEM.

APPLICATION FILED SEPT. 9, 1916.

Reissued Nov. 28, 1916.

14,219.

4 SHEETS—SHEET 3.

Inventor

William Morrison

By Byrnes Townsend & Brickenstein

Attorneys

W. MORRISON.

CENTRIFUGALLY REGULATED POWER TRANSMISSION SYSTEM.

APPLICATION FILED SEPT. 9, 1916.

Reissued Nov. 28, 1916.

14,219.

4 SHEETS—SHEET 4.

Inventor

William Morrison

By Byrne Townsend & Brickenstein

Attorneys

UNITED STATES PATENT OFFICE.

WILLIAM MORRISON, OF CHICAGO, ILLINOIS.

CENTRIFUGALLY-REGULATED POWER-TRANSMISSION SYSTEM.

14,219. Specification of Reissued Letters Patent. Reissued Nov. 28, 1916.

Original No. 1,176,396, dated March 21, 1916, Serial No. 32,952, filed June 8, 1915. Application for reissue filed September 9, 1916. Serial No. 119,305.

*To all whom it may concern:*

Be it known that I, WILLIAM MORRISON, a citizen of the United States, residing at Chicago, in the county of Cook and State of Illinois, have invented certain new and useful Improvements in Centrifugally-Regulated Power-Transmission Systems, of which the following is a specification.

My invention relates to an addition to or improvement on the systems of power distribution described in my prior Patents Nos. 1,126,059, 1,126,060, 1,126,061, patented January 26, 1915; and is particularly intended for use in connection with the system and controlling mechanism shown in my Patent No. 1,148,788, patented August 3, 1915, although broadly adapted for use with power-transmission systems involving the use of dynamo-electric clutches.

In the prior patents above referred to, I have described a system of power-transmission particularly adapted for driving automobiles, in which the power-shaft of the usual variable speed engine is connected to the load shaft through a dynamo-electric current-generating clutch, whereof the rotatable armature and rotatable field are connected one to the power shaft and the other to the load shaft, a storage battery being connected to the system. This dynamo-electric clutch is so constructed that it generates at relatively low slip speeds an amount of current sufficient for the clutching action, the energy developed by the engine above that required for clutching being available for transmission through the clutch to the load-shaft. The armature rotor is provided with a commutator having an internal surface against which bear the brushes carried by the field rotor, these brushes serving not only as current collecting devices, but because of proper proportioning and adjustment, as the pressure member of a centrifugal clutch, the other member being the commutator ring. In the operation of an automobile thus equipped, the dynamo-electric clutch at relatively low speeds generates current at a voltage substantially equal to or slightly above that of the storage battery. As the speed increases, the centrifugal clutching action becomes greater and greater until it reaches a point at which it will be sufficient to so diminish the slip between the rotors that the generated voltage will be less than that of the storage battery.

My present invention consists in adding to the system above described, an automatic cut-out, acting upon the increasing speed of the automobile to cut out the battery when the generator voltage becomes, because of the diminished slip speed, lower than that of the battery. There is thus prevented any possible back flow of current from the storage battery through the generator, this reverse flow, if permitted, not only wasting current, but tending to increase the slip. After the battery has been cut-out, the clutching action will be due to the combined centrifugal action and to the magnetic clutching between the two rotors, this latter factor, however, decreasing as the speed of the automobile and the resulting centrifugal clutching increases, until the two rotors may have very little, or even no, relative motion, so that there is little or no current flowing through the field coils, the car being driven largely or wholly through the centrifugal clutch. In practice this clutching action between the brushes and commutator ring has been found to be entirely sufficient, but a separate centrifugal clutch may be used, as described in my Patent No. 1,126,060, patented January 26, 1915.

I am aware that automatic cut-outs have before been associated with generators to cut out storage batteries from the circuit, and I make no claim to such a combination; but I believe I am the first to combine an automatic cut-out with a system of the kind above described, whereby a new result is produced; viz., that the battery is cut out upon the acceleration of the automobile.

Figure 2:
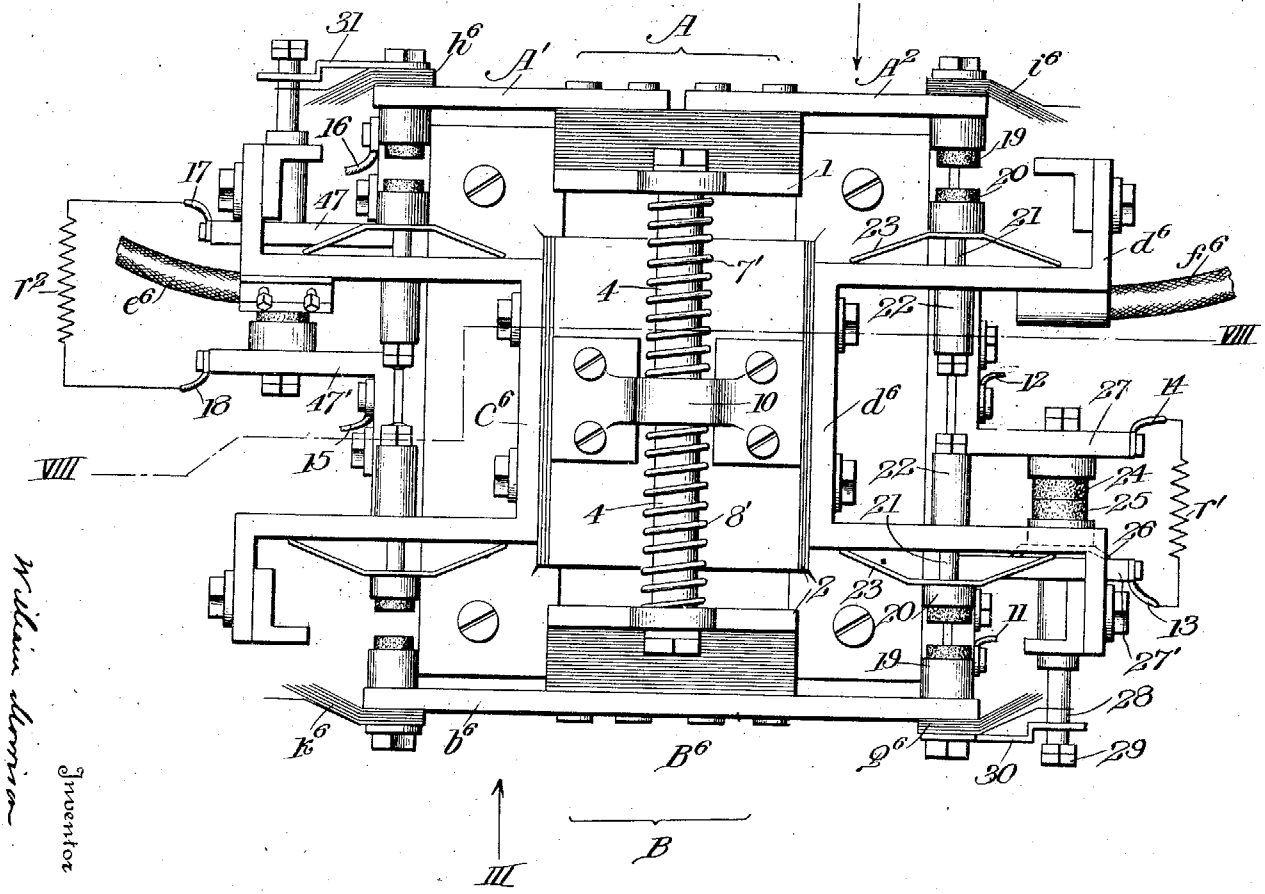
Figure 3:
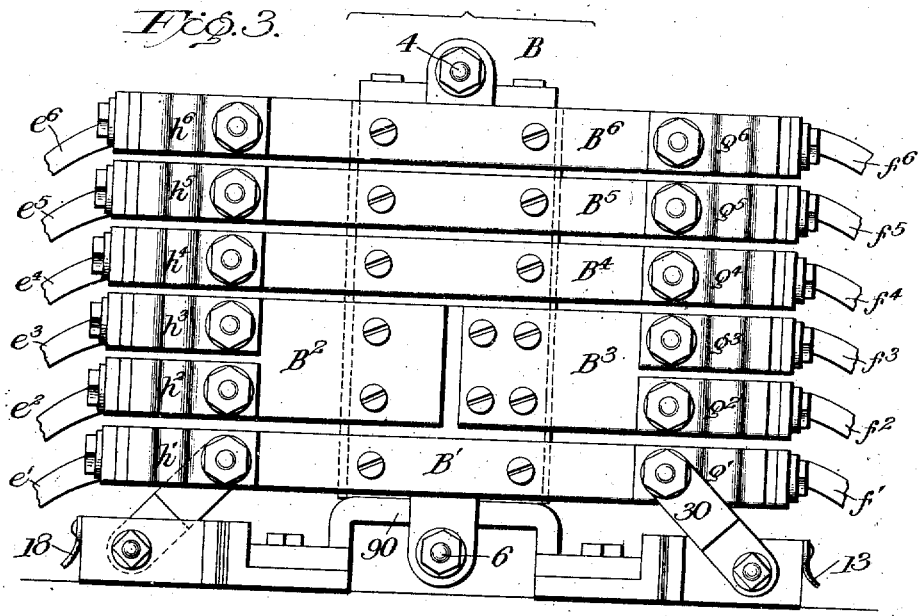
Figure 4:
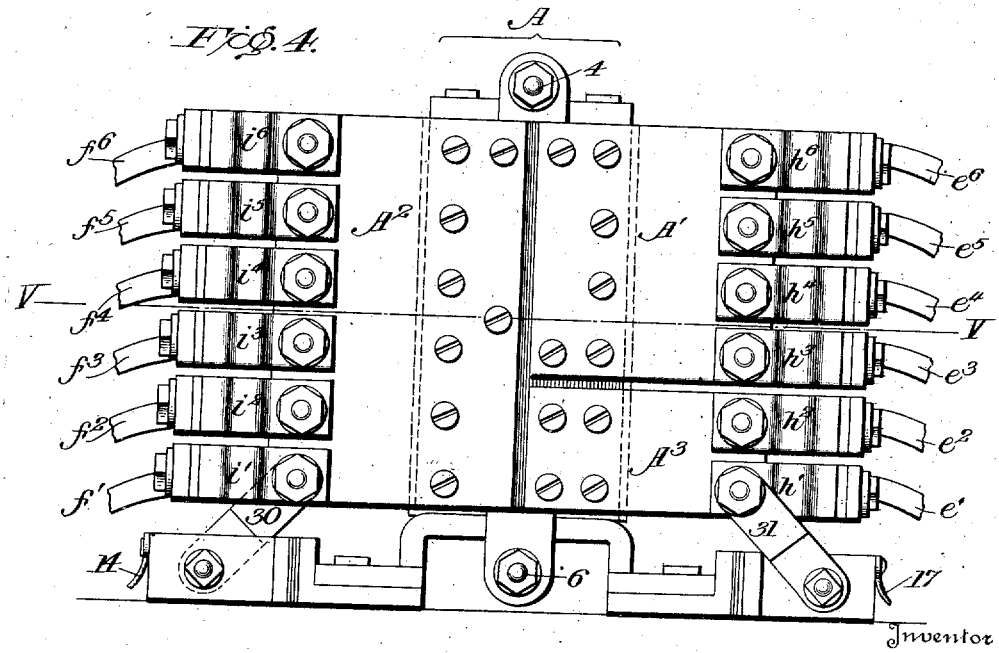
Figure 5:
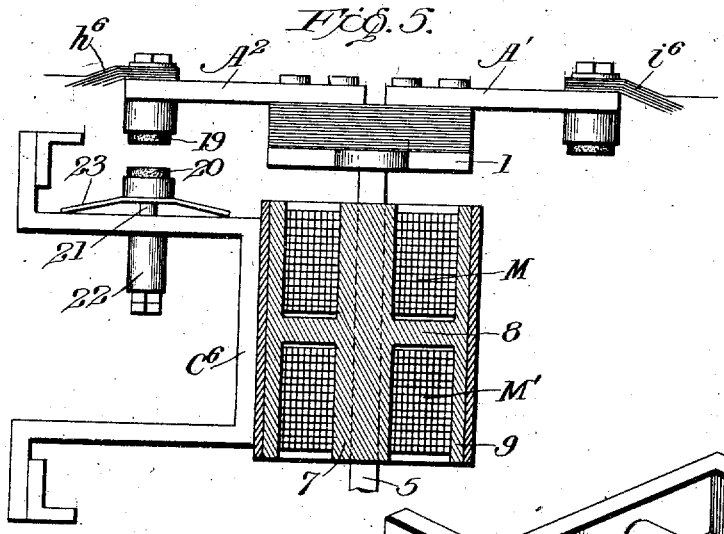
Figure 6:
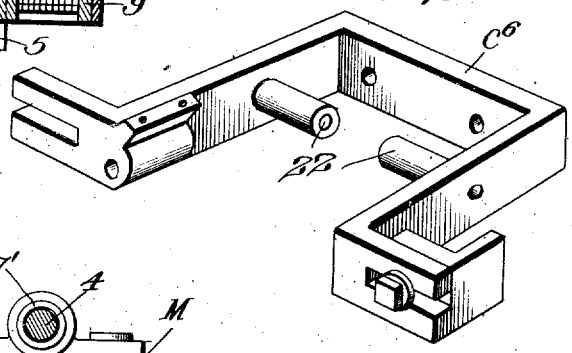
Figure 7:
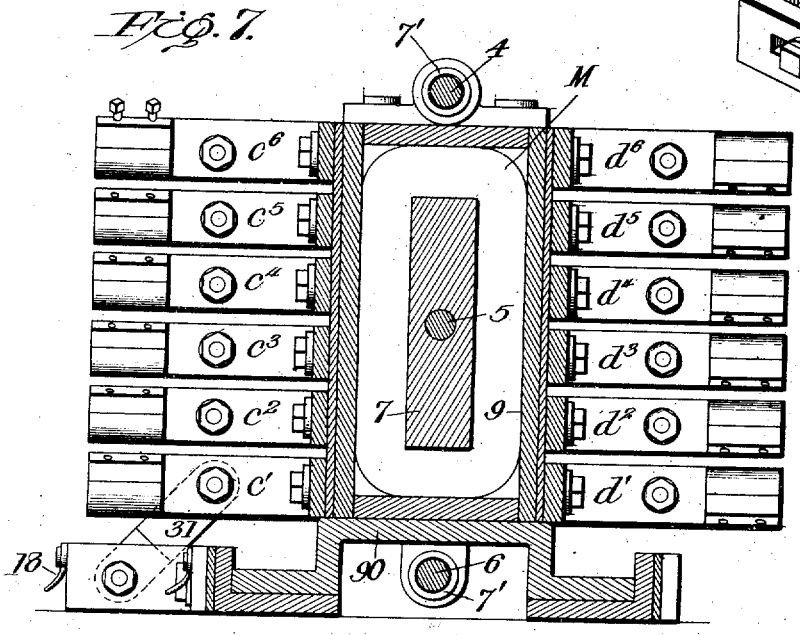

Referring to the drawings:—Figure 1 is a diagram of the system, the controller being shown in perspective, with the magnets omitted; Fig. 2 is a plan of the controller; Fig. 3 is a front view of the controller, looking in the direction of the arrow III in Fig. 2; Fig. 4 is a back view of the controller, looking in the direction of the arrow IV in Fig. 2; Fig. 5 is a horizontal section through the controller on plane V—V of Fig. 4; Fig. 6 is a perspective view of a connecting bar; Fig. 7 is a vertical section on plane VIII—VIII of Fig. 2; and Fig. 8 is a detail showing the lever system by which the hand and foot throttle levers are connected to the admission valve.

The controller comprises a suitable base to which is secured (Fig. 7) a rectangular iron or steel open-ended casing 9, inclosing the coils of two electromagnets M, $M^1$. Formed integrally with the casing is (Fig. 5) a vertical transverse web 8 from which extends laterally in both directions a longitudinal core 7, about which are wound separately the coils of the electromagnets M, $M^1$. To the sides of this casing and insulated therefrom are bolted two sets of fixed connecting bars $c^1$, $c^2$, $c^3$, $c^4$, $c^5$, $c^6$, and $d^1$, $d^2$, $d^3$, $d^4$, $d^5$, $d^6$, one set on each side, the bars having at each end surfaces against which bear brushes carried by the movable members A and B, operated by the magnets M and M′, respectively. To binding-posts on the bars $c^1$, $c^2$, $c^3$, $c^4$, $c^5$, $c^6$, are connected the wires $e^1$, $e^2$, $e^3$, $e^4$, $e^5$, $e^6$, and to binding-posts on the bars $d^1$, $d^2$, $d^3$, $d^4$, $d^5$, $d^6$ are connected the wires $f^1$, $f^2$, $f^3$, $f^4$, $f^5$, $f^6$.

The member A (Fig. 4) is made up of conducting plates $A^1$, $A^2$, $A^3$, and the member B (Fig. 3) is made up of conducting bars or plates $B^1$, $B^2$, $B^3$, $B^4$, $B^5$, $B^6$. These plates are fastened to but insulated from the armatures 1, 2, which are secured to the ends of rods 4, 6, arranged to slide on the casing 9, and also to the ends of rod 5 passing through an opening in the core 7. Expansion springs 7′, 8′, surround rods 4 and 6 and bear against the abutment guides 10 and against the armatures. Current from a battery is delivered to magnet coil M through wires 11, 12, secured to angle-bars 27, 27′, bolted to the base. Wires 13, 14, also connected respectively to these bars lead to the ends of a resistance coil $r'$.

15 and 16 are wires, connected to bars 47, 47′, leading from magnet coil M′ to a separate battery, these wires being connected through wires 17, 18 to resistance coil $r^2$.

As shown at the lower right hand of Fig. 2, a carbon contact 24 is secured to the angle bar 27, to which wires 12 and 14 are connected, and a corresponding movable carbon contact 25 is carried on a rod 28 passing through an opening in arm 30, bolted to the movable member B, which by its outward movement breaks the contact at 24, 25, thereby introducing into circuit of magnet coil M, the resistance $r'$. The parts are so timed in operation that the spring 26 keeps the contacts 24, 25 in engagement until near the end of the movement of member B, the full current strength passing through the coil M until the contacts 24, 25 are separated by arm 30 engaging the head 29 of rod 28, the current then being reduced by resistance $r'$ to an amount sufficient to hold the armature 1 in its attracted position, even against the pull of magnet M′ on its then distant armature 2, should the controlling circuit of this magnet M′ be closed. A similar device is operated by the arm 31, bolted to member A.

Electrically connected (see Fig. 5) to each one of the brushes carried by the members A and B is a carbon contact 19, and slidingly mounted and opposite each one of these contacts 19, is a second contact 20 carried on a rod 21, sliding in a socket 22. A spring 23 keeps the contact 20 normally in outward position, the parts being so arranged that the carbon contacts engage before the leaf-spring brushes engage with the ends of the connecting bar, and remain in contact until after the leaf-spring brushes have broken their contacts. Any sparking, therefore, takes place at the carbon contacts.

The details of construction of one connecting bar $c^6$, and all are alike, are shown in Fig. 6, and will be apparent without further description.

The conductor bars of the controller are made of aluminum, and are die-cast to exact shape. The magnet core and casing are of soft iron or mild steel. The wires are asbestos coated, so that the whole structure is compact, simple, and fireproof.

It will be noted that the various parts are all of simple shape, easily manufactured and easy to assemble.

Referring now to Fig. 1, which is a diagrammatic representation of the system with which the controller is used, the various connections and the operation of the system as a whole will be described. In Fig. 1, the magnets M, M′, have been, for clearness, shown apart from the controller. $M^2$ is a gas-engine having secured to its shaft L the armature G, having an internal commutator ring F. Bearing against the inside of this ring are brushes $E^1$, $E^2$, carried on brush-holders $E^3$, $E^4$, secured to the field-magnet structure H, here shown as having two poles, though in practice twelve poles are used, with three brushes for each pole, so that a considerable friction clutching action will result from the centrifugal force due to rotation. The field-magnet is mounted on the driven shaft I, which is connected through suitable transmission gearing I′, in the usual way, to the driving axle of the automobile. On the shaft I are four rings $D^1$, $D^2$, $D^3$, $D^4$, to which are connected the dynamo brushes and field-coils. In practice, the field coils are connected in sets, the general method of arrangement being, however, the same as that shown. Brushes $T^1$, $T^2$, $T^3$, $T^4$ take the current from these rings.

The throttle valve $n$ is actuated either from a foot pedal O, or from a hand lever P mounted on the steering-wheel of the automobile. The foot pedal O is pivoted at $O^2$ and has an arm 50 connected, by a link 51, to a crank arm on the rock shaft 52. A second crank arm 53 is connected by a link 54 to the operating lever of the admission valve $n$, O′ being a retracting spring. The hand lever P is mounted on the end of a shaft extending through the steering-pedestal, which shaft has at its end a crank arm 61 connected by a link 60 to the crank arm 59 on a rock shaft 58 which has at its other end a crank arm 57 connected by a flexible cable 56 to a crank arm 55 on the rock shaft 52. The retracting spring $O^1$ restores the parts, in the usual way, to the normal position in which the admission valve *n* is kept slightly open, to keep the engine running. The hand lever is provided with the usual friction means for keeping it in its adjusted position while the foot pedal, when the hand lever P is in the off position, may be independently operated. In practice, the hand lever P is seldom used except during the engine-starting operations, the foot pedal mainly being used during the running of the car.

Q is a spring blade on the end of the arm 50 for bridging the long contacts R, S, which are long enough to remain in contact with the blade Q in all the wider open positions of the admission valve. The blade Q is arranged to make and maintain connection between these contacts during the movement of the throttle levers but to break this connection in the most retracted or minimum-gas position.

To facilitate the starting of the engine, the additional switch V is provided in the circuit of the magnet M, and until this switch is closed, this magnet cannot be energized to connect the circuits into the running position. The switch V has a body of insulated material *v*, with a notched portion having a conducting strip $v^1$ with which are arranged to engage two spring terminals $v^2$, $v^3$. When the body *v* is pushed down, these springs $v^2$, $v^3$ bear against insulation; when the body *v* is pulled up, contact is made through strip $v^1$.

The operation of starting the engine is as follows:—Assuming that the automobile is at rest with the brake applied to prevent the car from moving, either one of the throttles, preferably the hand-throttle P, is opened to deliver gas to the engine in quantity sufficient to start it. The switch 32 is then closed, thereby causing current to flow from the battery $C^2$ (though of course a separate battery might be used) through the coil of magnet M′, which pulls up its armature and the member B carried thereby. The circuits thus made are as follows: from positive terminal of battery C′ through wire $e^3$, bar $c^3$, brush $k^3$, plate $B^2$, brush $k^2$, bar $c^2$, wire $e^2$, brush T′, collector ring D′, bruhes E′, coil H′, ring $D^2$, brush $T^2$, wire $f^1$, bar $d^1$, brush $g^1$, bar B′, brush $k^1$, bar $c^1$, wire $e^1$, brush $T^3$, ring $D^3$, coil $H^2$, brushes $E^2$, ring $D^4$ brush $T^4$, wire $f^2$, bar $d^2$, brush $g^2$, plate $B^3$, brush $g^3$, bar $d^3$, wire $f^3$, to negative end of battery $C^4$, thence from positive end of battery $C^4$ through wire $e^6$ bar $c^6$ brush $k^6$, bar $B^6$, brush $g^6$, bar $d^6$, wire $f^6$ to negative end of battery $C^3$, and so on until the negative end of battery $C^1$ is reached. At the same time, the armature has been connected in circuit at brushes $E^1$, $E^2$, so that the dynamo acting as a shunt-wound motor starts the engine. Thereupon the switch 32 is opened, breaking the starting circuit and deënergizing the magnet M′. The spring 8′ then restores the parts of the controller to the neutral position shown in Fig. 2. With the engine running, the hand-throttle is turned to the minimum gas position in which, while the gas admission valve is open enough to keep the engine running, the contacts R, S, are not bridged. The switch V, which up to this time has been open, is then closed and the throttle lever moved to further open the throttle valve. This further movement of the throttle lever causes the blade Q to bridge the contacts R, S, and as the switch V is now closed, the circuit to the magnet M is completed. The magnet M now pulls up its armature and with it the multiple member A, thereby connecting the dynamo and battery circuits in multiple. The circuits now closed may be traced from (positive pole) brushes E′, through coil H′, ring $D^2$, brush $T^2$, wire $f^1$, brush $i^1$, plate $A^2$, brush $i^2$, wire $f^2$, brush $T^4$, ring $D^4$, to brushes $E^2$. A second circuit in parallel to that just described goes from brush T′, wire $e^2$, brush $h^2$, plate $A^3$, brush $h^1$, wire $e^1$, brush $T^3$, ring $D^3$, coil $H^2$, to brushes $E^2$. At the same time all the negative poles of the batteries have been connected through their wires $f^3$, $f^4$, $f^5$, $f^6$, and brushes $i^3$, $i^4$, $i^5$, $i^6$, to plate $A^2$, and the positive ends of the batteries have been connected through wires $e^3$, $e^4$, $e^5$, $e^6$, and brushes $h^3$, $h^4$, $h^5$, $h^6$, with plate A′. In this position of the controller, the field coils are connected in multiple, and the batteries are also in multiple, both coils and batteries being in shunt to the armature. The dynamo is now in position to act as a clutching generator, and to generate current because of the slip between the armature and field-magnet. After the car has been started, the operator controls the speed entirely by opening and closing the throttle, the acceleration and retardation being effected by simple manipulation of the throttle lever in the usual way. As the contacts R, S, are bridged by the blade Q in all the wider open positions of either throttle, the operation of the controller is automatic. Thus if the automobile be running at high speed and the throttle be shut off to lower the speed of the engine, the controller will be automatically operated to break the dynamo circuits while, when the gas is again turned on, the throttle lever will close the controller circuit and the dynamo circuits will again be brought into operative position.

In order to automatically cut out the storage battery as higher speeds are reached, I insert between the wires $m^2$ and $m^3$ (Fig. 1) an automatic cut-out, which may be of any well-known type. As illustrated, it comprises a high resistance coil 60 and a low resistance coil 61, wound about U-shaped cores flexibly secured at their upper portions by a resilient steel strip 62. At their lower ends they carry suitable binding-posts for the necessary circuit connections. The circuit connections are from the wire $e^2$ (connected to the positive brush E′, of the dynamo), wire $m^2$, high resistance coil 60, wire $f^1$, wire $f^2$, to the negative pole $E^2$ of the dynamo. The cores are thus magnetized and an additional circuit is closed at 63, 64, current now flowing also from wire $m^2$, through contacts 63, 64, wire $m^3$, and wire $e^3$ to the positive poles of the battery (in multiple). In case it is not desired to use the automatic cut-out, the switch S may be closed.

The manner in which this cut-out operates is as follows: As the speed of the automobile increases, the centrifugal clutching effect increases and the relative speed of the dynamo rotors is decreased, thereby gradually diminishing the generated voltage, until it reaches a point where the battery voltage is sufficient to reverse the current, whereupon the cut-out acts and the circuit is broken at 63, 64, thus automatically cutting out the battery. The dynamo circuits, however, remain intact, and are still effective to produce whatever clutching power be demanded, the current generated in the armature flowing through the field circuits. In operation, whenever the voltage generated by the dynamo-electric clutch is less than that of the battery, the cut-out operates to exclude the storage battery from the system. This may occur, and this is an essential feature of my invention, when the automobile is increasing in speed. Thus, as the speed increases, the centrifugal action increases, and, unless the power demands are large, as when going through sandy roads or up heavy grades, the relative slip of the rotors decreases, thereby lessening the electrical energy consumed in clutching. Under favorable conditions, as when running along comparatively level roads, as the speed rises the centrifugal clutching effect increases, and may increase after the battery has been cut out, to such an extent as to prevent any current being generated in the armature to flow over the field, and may even prevent any slip between the two rotors. The effect of the battery current flowing in the reverse direction through the dynamo circuits is to increase the slip by trying to drive the dynamo as a motor, (as described in my Patent No. 1,126,060). This reactive or braking effect is entirely obviated by my present invention.

It will be noted that the automatic cut-out is in that circuit which is delivering current for charging the battery, and at the same time producing the clutching effect.

It will be understood that my invention is applied to gas-engine driven automobiles, equipped in the usual way, the power being transmitted from the driven shaft to the driving axle through variable transmission gearing. My dynamo-electric clutch takes the place of the fly-wheel, and acts simply as a means for transmitting to the driven shaft all the power developed by the engine, except the small amount of power required to produce the electrical energy used in the clutch.

I claim:—

1. A dynamo-electric clutch having a rotatable armature, a rotatable field, a centrifugally acting clutch between the armature and field, a storage battery in circuit, and an automatic cut-out in the battery circuit.

2. A dynamo-electric clutch having a rotatable armature, a rotatable field, an internal commutator on the armature, centrifugally actuated current-collecting and clutching devices engaging the commutator, a storage battery in circuit, and an automatic cut-out in the battery circuit.

3. A power-transmission system comprising a variable speed engine, a driving shaft connected to the engine, and a driven shaft connected to the load, a dynamo-electric cluth comprising a rotatable armature and a rotatable field magnet, one connected to the driving shaft and the other to the driven shaft, one of the said rotors having movably connected thereto parts adapted to be actuated by centrifugal force, and the other rotor having a member with which said parts are adapted to frictionally engage, a storage battery, and automatic means for including the storage battery in circuit at lower speeds and cutting it out at higher speeds.

4. A power transmission system comprising a variable speed engine, a driving shaft connected to the engine, and a driven shaft connected to the load, a dynamo-electric clutch comprising a rotatable armature and a rotatable field magnet, one connected to the driving shaft and the other to the driven shaft, one of the said rotors having movably connected thereto parts adapted to be actuated by centrifugal force and the other rotor having a member with which said parts are adapted to frictionally engage, a storage battery, and an automatic cut-out arranged to exclude the storage battery from the system, whenever the centrifugal action causes the diminution of the generator voltage to a point below the voltage of the battery.

5. A power-transmission system comprising a variable speed engine, a driving shaft connected to the engine, and a driven shaft connected to the load, a dynamo-electric clutch comprising a rotatable armature and a rotatable field magnet, one connected to the driving shaft and the other to the driven shaft, one of the said rotors having movably connected thereto parts adapted to be actuated by centrifugal force and the other rotor having a member with which said parts are adapted to frictionally engage, a storage battery, and an automatic cut-out arranged to cut out the battery when the voltage of the storage battery exceeds that of the dynamo.

6. A power transmission system comprising a variable speed engine, a driving shaft connected to the engine, and a driven shaft connected to the load, a dynamo-electric clutch comprising a rotatable armature and a rotatable field magnet, one connected to the driving shaft and the other to the driven shaft, one of the said rotors having movably connected thereto parts adapted to be actuated by centrifugal force and the other rotor having a member with which said parts are adapted to frictionally engage, a storage battery, a controlling switch arranged to connect the cells of the battery in series or in multiple circuit with the dynamo terminals, and an automatic cut-out for the storage battery in the multiple circuit.

7. A power-transmission system comprising a dynamo-electric current-generating clutch having a rotatable armature and a rotatable field, a storage battery in circuit with said dynamo, and an automatic cut-out for the storage battery located in the clutching circuit.

8. A driving shaft, a driven shaft, clutch mechanism between said shafts comprising electromagnetic means, a storage battery in circuit therewith, and automatic means for removing said battery from circuit when the relative speed between said shafts decreases to a predetermined amount.

9. A driving shaft, a driven shaft, clutch mechanism between said shafts comprising electromagnetic and centrifugally acting mechanical friction means, a storage battery in circuit, and automatic means for removing the battery from circuit when the relative speed of said shafts decreases to a predetermined amount.

10. A variable speed engine, a driving shaft, a driven shaft, clutch mechanism between said shafts comprising electromagnetic means, a storage battery in circuit with said means, a throttle lever for the gas engine, means controlled by said lever for rendering said electromagnetic means effective and ineffective, and automatic means for removing said battery from circuit.

11. A variable speed engine, a driving shaft, a driven shaft, clutch mechanism between said shafts comprising electromagnetic and centrifugally operated mechanical means, a storage battery in circuit with said clutch mechanism, a throttle lever for the engine, means controlled by said lever for affecting said clutch mechanism, and automatic means for removing said battery from circuit when the relative speed of said shafts decreases to a predetermined amount.

12. A driving shaft, a driven shaft, clutch mechanism between said shafts comprising electromagnetic and centrifugally acting mechanical means, a storage battery in circuit, and automatic means for removing the battery from the circuit.

WILLIAM MORRISON.

Copies of this patent may be obtained for five cents each, by addressing the "Commissioner of Patents, Washington, D. C."